(12) United States Patent
Budhram

(10) Patent No.: US 6,260,872 B1
(45) Date of Patent: Jul. 17, 2001

(54) TRACTOR TRAILER ANTI-JACKKNIFING SYSTEM

(76) Inventor: Bhardwaj Budhram, 1717 Colonial Gardens Dr., Avenel, NJ (US) 07001

( * ) Notice: Subject to any disclaimer, the term of this patent is extended or adjusted under 35 U.S.C. 154(b) by 0 days.

(21) Appl. No.: 09/365,045

(22) Filed: Jul. 30, 1999

(51) Int. Cl.[7] ............................................. B62D 53/08
(52) U.S. Cl. ................................................... 280/432
(58) Field of Search ................................ 280/432, 433, 280/438.1, 441.1

(56) References Cited

U.S. PATENT DOCUMENTS

| | | | |
|---|---|---|---|
| 4,120,514 | * 10/1978 | Sanders | 280/432 |
| 4,556,232 | * 12/1985 | Sever | 280/432 |
| 4,573,699 | * 3/1986 | Smith | 280/432 |
| 4,585,248 | * 4/1986 | Miller et al. | 280/432 |
| 5,456,483 | * 10/1995 | Madsen et al. | 280/432 |
| 5,730,454 | * 3/1998 | Dudzik et al. | 280/432 |

* cited by examiner

Primary Examiner—Kevin Hurley

(57) ABSTRACT

A tractor trailer anti-jackknifing system for preventing a trailer from jackknifing when coupled to a tractor. The tractor trailer anti-jackknifing system includes a hitch plate designed for mounting to a tractor with a center hole for receiving a kingpin of a trailer therein and an arcuate first pin slot. The system also includes a bottom plate designed for mounting to the trailer. The bottom plate has a kingpin hole designed for extending the kingpin of the trailer therethrough and an arcuate second pin slot. A fluidic piston-cylinder actuator is mounted to the hitch plate beneath the first pin slot of the hitch plate. The fluidic piston-cylinder actuator has a cylinder portion and a piston portion retractably extendable from the cylinder portion. The piston portion is extended into the first pin slot of the hitch plate. The piston portion is extendable to an extended position where the piston portion upwards extends into the second pin slot of the bottom plate.

9 Claims, 3 Drawing Sheets

TRACTOR TRAILER ANTI-JACKKNIFING SYSTEM

BACKGROUND OF THE INVENTION

1. Field of the Invention

The present invention relates to tractor trailer anti-jackknifing systems and more particularly pertains to a new tractor trailer anti-jackknifing system for preventing a trailer from jackknifing when coupled to a tractor.

2. Description of the Prior Art

The use of tractor trailer anti-jackknifing systems is known in the prior art. More specifically, tractor trailer anti-jackknifing systems heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. No. 5,253,893; U.S. Pat. No. 5,259,640; U.S. Pat. No. 4,991,863; U.S. Pat. No. 4,775,165; U.S. Pat. No. Des. 323,804; and U.S. Pat. No. 4,204,700 which are all incorporated by reference herein to the extent necessary for understanding of the present invention.

While these devices fulfill their respective, particular objectives and requirements, the aforementioned patents do not disclose a new tractor trailer anti-jackknifing system. The inventive device includes a hitch plate designed for mounting to a tractor with a center hole for receiving a kingpin of a trailer therein and an arcuate first pin slot. The system also includes a bottom plate designed for mounting to the trailer. The bottom plate has a kingpin hole designed for extending the kingpin of the trailer therethrough and an arcuate second pin slot. A fluidic piston-cylinder actuator is mounted to the hitch plate beneath the first pin slot of the hitch plate. The fluidic piston-cylinder actuator has a cylinder portion and a piston portion retractably extendable from the cylinder portion. The piston portion is extended into the first pin slot of the hitch plate. The piston portion is extendable to an extended position where the piston portion upwards extends into the second pin slot of the bottom plate.

In these respects, the tractor trailer anti-jackknifing system according to the present invention substantially departs from the conventional concepts and designs of the prior art, and in so doing provides an apparatus primarily developed for the purpose of preventing a trailer from jackknifing when coupled to a tractor.

SUMMARY OF THE INVENTION

In view of the foregoing disadvantages inherent in the known types of tractor trailer anti-jackknifing systems now present in the prior art, the present invention provides a new tractor trailer anti-jackknifing system construction wherein the same can be utilized for preventing a trailer from jackknifing when coupled to a tractor.

The general purpose of the present invention, which will be described subsequently in greater detail, is to provide a new tractor trailer anti-jackknifing system apparatus and method which has many of the advantages of the tractor trailer anti-jackknifing systems mentioned heretofore and many novel features that result in a new tractor trailer anti-jackknifing system which is not anticipated, rendered obvious, suggested, or even implied by any of the prior art tractor trailer anti-jackknifing systems, either alone or in any combination thereof.

To attain this, the present invention generally comprises a hitch plate designed for mounting to a tractor with a center hole for receiving a kingpin of a trailer therein and an arcuate first pin slot. The system also includes a bottom plate designed for mounting to the trailer. The bottom plate has a kingpin hole designed for extending the kingpin of the trailer therethrough and an arcuate second pin slot. A fluidic piston-cylinder actuator is mounted to the hitch plate beneath the first pin slot of the hitch plate. The fluidic piston-cylinder actuator has a cylinder portion and a piston portion retractably extendable from the cylinder portion. The piston portion is extended into the first pin slot of the hitch plate. The piston portion is extendable to an extended position where the piston portion upwards extends into the second pin slot of the bottom plate.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new tractor trailer anti-jackknifing system apparatus and method which has many of the advantages of the tractor trailer anti-jackknifing systems mentioned heretofore and many novel features that result in a new tractor trailer anti-jackknifing system which is not anticipated, rendered obvious, suggested, or even implied by any of the prior art tractor trailer anti-jackknifing systems, either alone or in any combination thereof.

It is another object of the present invention to provide a new tractor trailer anti-jackknifing system which may be easily and efficiently manufactured and marketed.

It is a further object of the present invention to provide a new tractor trailer anti-jackknifing system which is of a durable and reliable construction.

An even further object of the present invention is to provide a new tractor trailer anti-jackknifing system which is susceptible of a low cost of manufacture with regard to both materials and labor, and which accordingly is then susceptible of low prices of sale to the consuming public, thereby making such tractor trailer anti-jackknifing system economically available to the buying public.

Still yet another object of the present invention is to provide a new tractor trailer anti-jackknifing system which provides in the apparatuses and methods of the prior art some of the advantages thereof, while simultaneously overcoming some of the disadvantages normally associated therewith.

Still another object of the present invention is to provide a new tractor trailer anti-jackknifing system for preventing a trailer from jackknifing when coupled to a tractor.

Yet another object of the present invention is to provide a new tractor trailer anti-jackknifing system which includes a hitch plate designed for mounting to a tractor with a center hole for receiving a kingpin of a trailer therein and an arcuate first pin slot. The system also includes a bottom plate designed for mounting to the trailer. The bottom plate has a kingpin hole designed for extending the kingpin of the trailer therethrough and an arcuate second pin slot. A fluidic piston-cylinder actuator is mounted to the hitch plate beneath the first pin slot of the hitch plate. The fluidic piston-cylinder actuator has a cylinder portion and a piston portion retractably extendable from the cylinder portion. The piston portion is extended into the first pin slot of the hitch plate. The piston portion is extendable to an extended position where the piston portion upwards extends into the second pin slot of the bottom plate.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

With reference now to the drawings, and in particular to FIGS. 1 through 6 thereof, a new tractor trailer anti-jackknifing system embodying the principles and concepts of the present invention will be described.

As best illustrated in FIGS. 1 through 6, the tractor trailer anti-jackknifing system generally comprises a hitch plate designed for mounting to a tractor with a center hole for receiving a kingpin of a trailer therein and an arcuate first pin slot. The system also includes a bottom plate designed for mounting to the trailer. The bottom plate has a kingpin hole designed for extending the kingpin of the trailer therethrough and an arcuate second pin slot. A fluidic piston-cylinder actuator is mounted to the hitch plate beneath the first pin slot of the hitch plate. The fluidic piston-cylinder actuator has a cylinder portion and a piston portion retractably extendable from the cylinder portion. The piston portion is extended into the first pin slot of the hitch plate. The piston portion is extendable to an extended position where the piston portion upwards extends into the second pin slot of the bottom plate.

Figure 1:
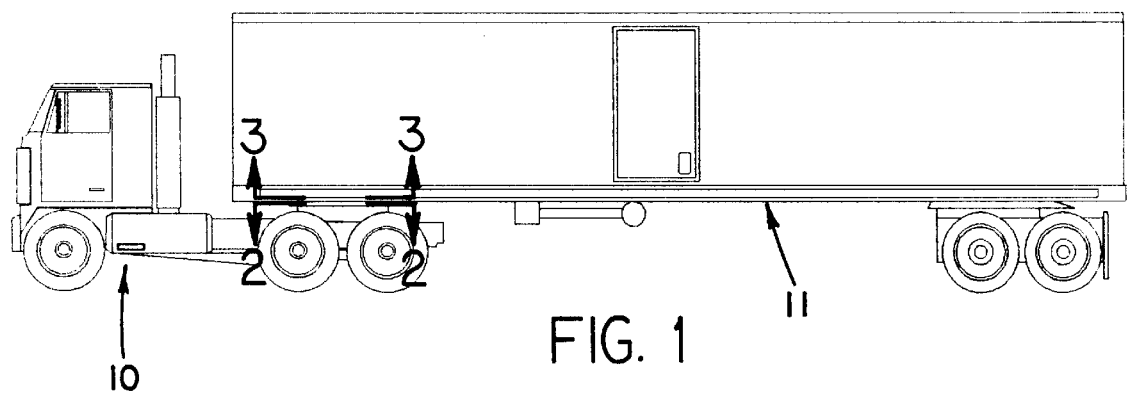
FIG. 1 is a schematic side view of a new tractor trailer anti-jackknifing system according to the present invention.
Figure 2:
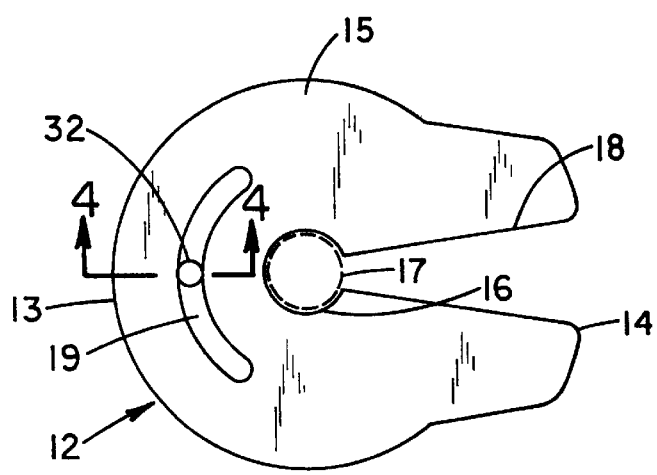
FIG. 2 is a schematic top view of a hitch plate of the present invention taken from line 2—2 of FIG. 1.

FIG. 1 illustrates a tractor 10 and a trailer 11 with the anti-jackknifing system. The tractor has a fifth wheel hitch plate 12 mounted thereto. As illustrated in FIG. 2, the hitch plate typically is generally horseshoe-shaped and has front and back ends 13, 14 and a substantially planar upper face 15.

The hitch plate also has a generally circular center hole 16 through the upper face of the hitch plate for receiving a kingpin 17 therein, and a rear slot 18 extending between the center hole and the back end of the hitch plate to provide a passage into the center hole from the back end of the hitch plate to permit insertion of a kingpin into the center hole. The rear slot has a pair of substantially straight sides that may converge towards one another in a direction from the back end to the center hole of the hitch plate.

The hitch plate has an arcuate first pin slot 19 through the upper face of the hitch plate. The first pin slot of the hitch plate is positioned between the front end and the center hole of the hitch plate. The first pin slot of the hitch plate has a concavity facing towards the center hole of the hitch plate. In one embodiment, the concavity of the first pin slot may have a radius of curvature originating from a center of the center hole such that the first pin slot is concentrically aligned with the center hole of the hitch plate.

The trailer has a forwardly positioned and downwardly extending kingpin which is inserted into the center hole of the hitch plate to couple the trailer to the tractor.

Figure 3:
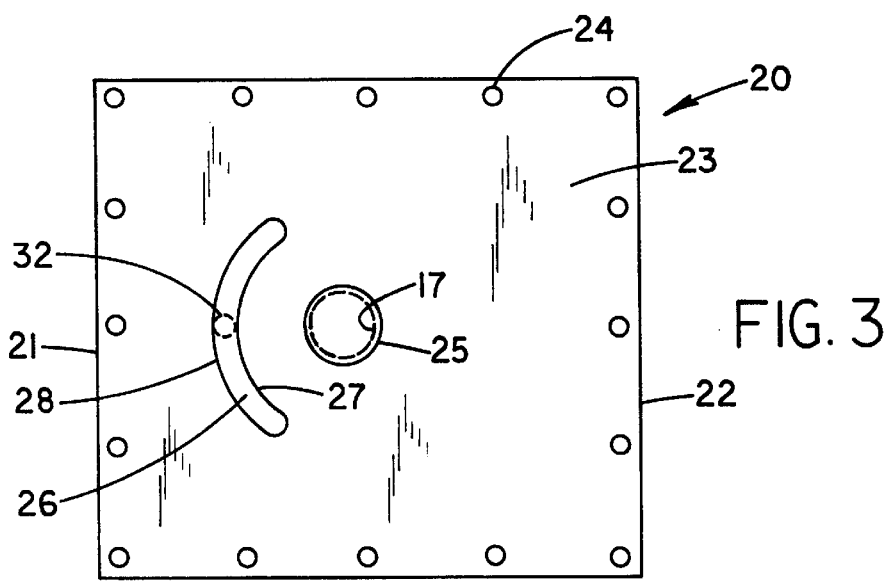
FIG. 3 is a schematic bottom view of a bottom plate of the present invention taken from line 3—3 of FIG. 1.

Turning to FIG. 3, the trailer also has a bottom plate 20 mounted thereto on a lower face of the trailer towards a front end of the trailer. The bottom plate may be generally rectangular in shape and has front and back ends 21, 22, and a substantially planar lower face 23.

The bottom plate may have a plurality of mounting holes 24 through the lower face of the bottom plate for extending fasteners therethrough to mount the bottom plate to the trailer. The mounting holes of the bottom plate may be positioned along an outer perimeter of the bottom plate. In one such embodiment, the mounting holes of the bottom plate may be spaced apart at substantially equal intervals along the outer perimeter of the bottom plate.

The bottom plate may have a centrally positioned and generally circular kingpin hole 25 through the lower face of the bottom plate through which the kingpin of the trailer is downwardly extended. The bottom plate also has an arcuate second pin slot 26 through the lower face of the bottom plate. The second pin slot of the bottom plate is positioned between the front end and the kingpin hole of the bottom plate.

The second pin slot of the bottom plate also has a concavity facing towards the kingpin hole of the bottom plate. The concavity of the second pin slot has a radius of curvature originating from a center of the kingpin hole such that the second pin slot is concentrically aligned with the kingpin hole of the bottom plate.

The first and second pin slots may be vertically aligned with one another so that the second pin slot is positioned above the first pin slot. In one embodiment, the first and second pin slots may have radii of curvatures of substantially equal length such that the pin slots define substantially equal sized arcs. The arcs of the pin slots may each define an angle in a possible range between about 90 degrees and about 180 degrees. In one illustrative embodiment, the arcs of the pin slots each may define an angle of about 110 degrees.

The first and second pin slots each may also have substantially evenly spaced apart inner and outer arcuate side edges 27, 28 defining a width of the respective pin slot therebetween. In one embodiment, the widths of the pin slots are substantially equal to each other.

Figure 4:
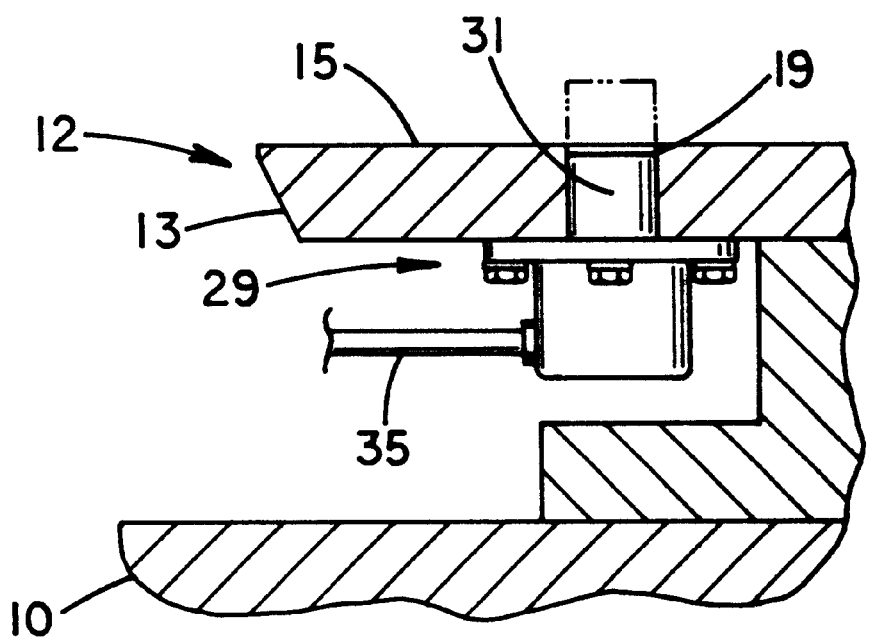
FIG. 4 is a schematic partial cross sectional view taken from line 4—4 illustrating an embodiment of a piston-cylinder actuator of the present invention.

As illustrated in FIG. 4, a fluidic piston-cylinder actuator 29 is mounted to the hitch plate beneath the first pin slot of the hitch plate. The fluidic piston-cylinder actuator may be centrally positioned in the first pin slot between opposite ends of the first pin slot (see FIG. 3). The fluidic piston-cylinder actuator has a cylinder portion 31 and a piston portion 32 retractably extendable from the cylinder portion.

The piston portion is extended into the first pin slot of the hitch plate. The piston portion is selectively positionable in a retracted position and an extended position with respect to the cylinder portion. The piston portion is positioned in the first pin slot beneath the upper face of the hitch plate when the piston portion is positioned in the retracted position. The piston portion is upwardly extended from the upper face of the hitch plate and into the second pin slot of the bottom plate (as shown by the broken lines in FIG. 4) when the piston portion is positioned in the extended position.

In use, the piston portion is slidable along the length of the second pin slot to permit turning of the trailer when towed by the tractor. The piston portion prevents the trailer from jackknifing when positioned in the extended position by preventing the turning of the trailer beyond an angle at which the piston portion abuts either end of the second pin slot.

The system may include a control unit 33 in communication with the fluidic piston-cylinder actuator for controlling positioning of the piston portion in the retracted and extended positions. In one embodiment, the tractor may have a compressor/pump 34 in fluid communication with the cylinder portion of the fluidic piston-cylinder actuator by a conduit 35 for moving the piston portion between the retracted and extended positions. In one such embodiment, the compressor may pump fluid into the cylinder portion to move the piston portion to the extended position and remove fluid from the cylinder portion to move the piston portion to the retracted position.

Figure 5:
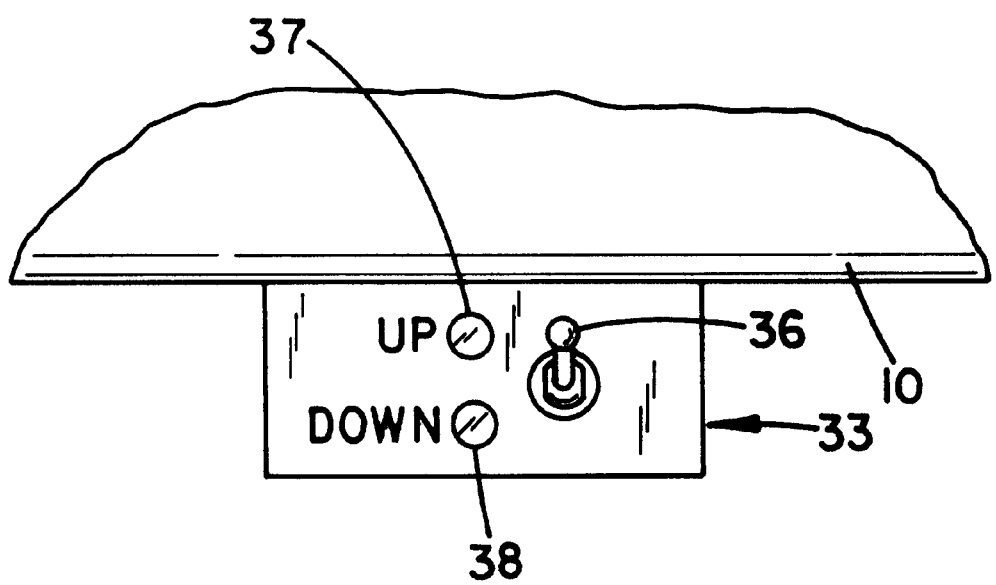
FIG. 5 is a schematic side view of a control unit of the present invention.
Figure 6:
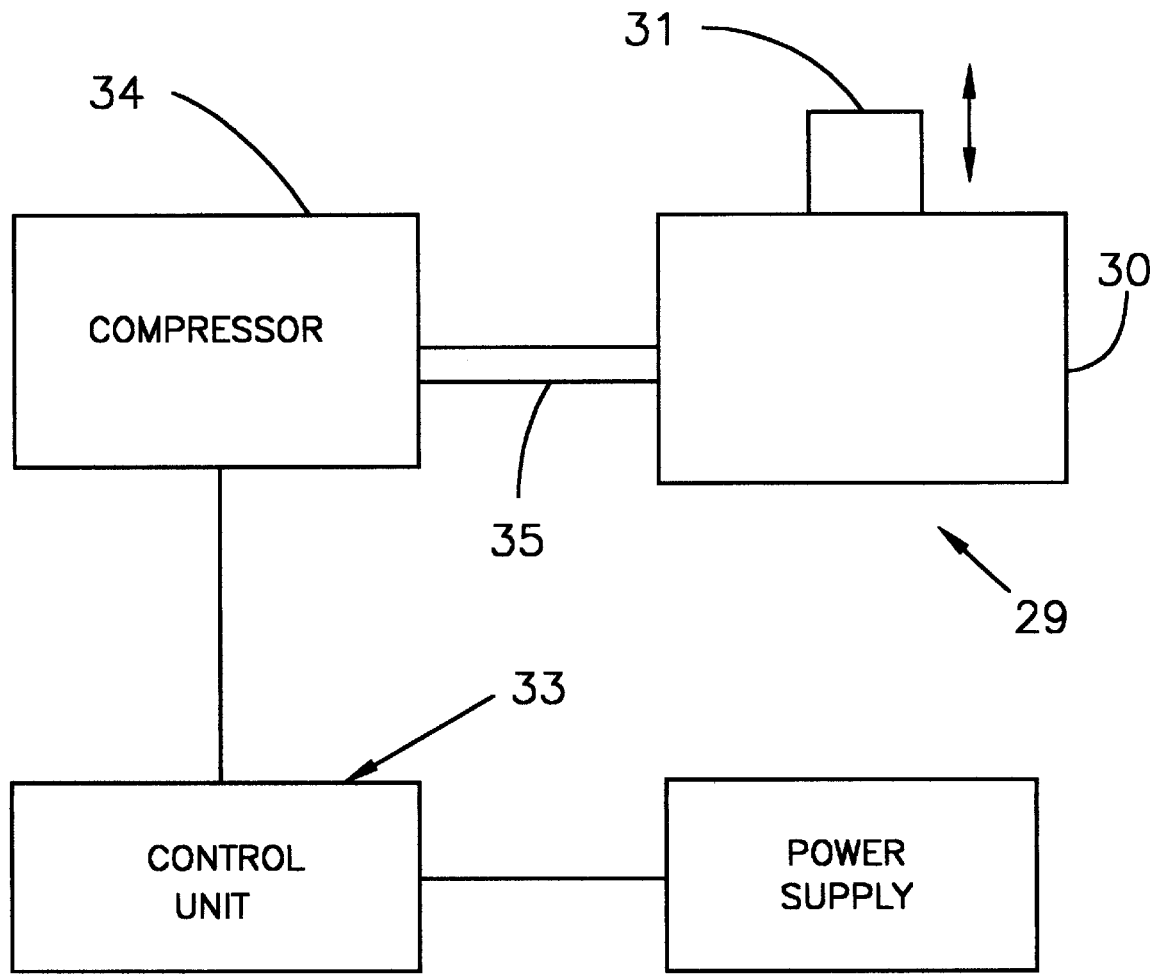
FIG. 6 is a schematic box diagram of the present invention.

In such an embodiment, the control unit is electrically connected to the compressor to control actuation of the compressor. As illustrated in FIG. 5, the control unit may have an actuator 36 for selectively controlling actuation of the compressor to position the piston in the retracted and extended positions. The control unit may also have a pair of visual indicators 37,38 (such as a pair of light sources) mounted to the housing of the control unit. In use, one of the visual indicators may be illuminated when the piston portion is in the retracted position and the other of the visual indicators may be illuminated when the piston portion is in the extended position.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and chances will readily occur to those skilled in the art, it is not desired to limit the invention to the exact construction and operation shown and described, and accordingly, all suitable modifications and equivalents may be resorted to, falling within the scope of the invention.

I claim:

1. An anti-jackknifing system for a trailer coupled to a tractor, comprising:

a hitch plate adapted for mounting to a tractor;

said hitch plate having a center hole for receiving a kingpin of a trailer therein, and an arcuate first pin slot;

a bottom plate adapted for mounting to the trailer;

said bottom having a kingpin hole adapted for extending the kingpin of the trailer therethrough, and an aruate second pin slot;

a fluidic piston-cylinder actuator being mounted to said hitch plate beneath said first pin slot of said hitch plate;

said fluidic piston-sylinder actuator having a cylinder portion and a piston portion retractably extendable from said cylinder portion;

said piston portion being extended into said first pin slot of said hitch plate; and said piston portion being extendable to an extended position where said piston portion upwards extends into said second pin slot of said bottom plate; and where said first pin slot of said hitch plate has a concavity facing towards said center hole of said hitch plate, and wherein said second pin slot of said bottom plate has a concavity facing towards said kingpin hole of said bottom plate.

2. The anti-jackknifing system of claim 1, said first and second pin slots having radius of curvatures of substantially equal length such that said pin slots define substantially equal sized arcs, said arcs of said pins slots each defining an angle between about 90 degrees and about 180 degrees.

3. The anti-jackknifing system of claim 1, wherein said concavity of said first pin slot has a radius of curvature originating from a center of said center hole such that said first pin slot is concentrically aligned with said center hole of said hitch plate, and wherein said concavity of said second pin slot has a radius of curvature originating from a center of said kingpin hole such that said second pin slot is concentrically aligned with said kingpin hole of said bottom plate.

4. The anti-jackknifing system of claim 3, wherein said first and second pin slots each have substantially evenly spaced apart inner and outer arcuate side edges defining a width of the respective pin slot therebetween, and wherein said widths of said pin slots are substantially equal to each other.

5. The anti-jackknifing system of claim 1, wherein said bottom plate has a plurality of mounting holes through said lower face of said bottom plate for extending faxteners therethrough to mount said bottom plate to said trailer.

6. The anti-jackknifing system of claim 5, wherein said mounting holes of said bottom plate are positioned along an outer perimeter of said bottom plate.

7. The anti-jackknifing system of claim 1, further comprising a control unit being in communication with said fluidic piston-cylinder actuator for controlling the positioning of said piston portion.

8. The anti-jackknifing system of claim 7, wherein said control unit having a pair of visual indicators for indicating the positioning of said piston portion.

9. An anti-jackknifing system, comprising:
   a tractor having a hitch plate mounted thereto;
   said hitch plate having front and back ends and a substantially planar upper face;
   said hitch plate having a generally circular center hole through said upper face of said hitch plate, and a rear slot extending between said center hole and said back end of said hitch plate;
   said rear slot having a pair of substantially straight sides converging towards one another in a direction from said back end to said center hole of said hitch plate;
   said hitch spate having an arcuate first pin slot through said upper face of said hitch plate;
   said first pin slot of said hitch plate being positioned between said front end and said center hole of said hitch plate;
   said first pin slot of said hitch plate having a concavity facing towards said center hole of said hitch plate;
   said concavity of said first pin slot having a radius of curvature originating from a center of said center hole such that said first pin slot is concentrically aligned with said center hole of said hitch plate;
   a trailer having a downwardly extending kingpin inserted into said center hole of said hitch plate to couple said trailer to said tractor;
   said trailer having a bottom plate mounted thereto;
   said bottom plate having front and back ends, and a substantially planar lower face;
   said bottom plate having a plurality of mounting holes through said lower face of said bottom plate for extending fasteners therethrough to mount said bottom plate to said trailer;
   said mounting holes of said bottom plate being positioned along an outer perimeter of said bottom plate;
   said mounting holes of said bottom plate being spaced apart a substantially equal intervals;
   said bottom plate having a centrally positioned and generally circular kingpin hole through said lower face of said bottom plate, said kingpin of said trailer being downwardly extended through said kingpin hole;
   said bottom plate; having an arcuate second pin slot through said lower face of said bottom plate
   said second pin slot of said bottom plate being positioned between said front end and said kingpin hole of said bottom plate;
   said second pin slot of said bottom plate having a concavity facing towards said kingpin hole of said bottom plate;
   said concavity of said second pin slot having a radius of curvature originating from a center of said kingpin hole such that said second pin slot is concentrically aligned with said kingpin hole of said bottom plate;
   said first and second pin slots having radii of curvatures of substantially equal length such that said pin slots define substantially equal sized arcs;
   said arcs of said pin slots each defining an angle between about 90 degrees and about 180 degrees;
   said first and second pin slots each having substantially evenly spaced apart inner and outer arcuate side edges defining a width of the respective pin slot therebetween;
   wherein said widths of said pin slots are substantially equably to each other;
   a fluidic piston-cylinder actuator being mounted to said hitch plate beneath said first pin slot of said hitch plate, said fluidic piston-cylinder actuator being centrally positioned in said first pin slot between opposite ends of said first pin slot;
   said fluidic piston-cylinder actuator having a cylinder portion and a piston portion retractably extendable from said cylinder portion;
   said piston portion being extended into said first pin slot of said hitch plate;
   said piston portion being selectively positionable in a retracted position and an extended position;
   said piston portion being positioned beneath said upper face of said hitch plate when said piston portion is positioned in said retracted position;
   said piston portion being upwardly extended from said upper face of said hitch plate and into said second pin slot of said bottom plate when said piston portion is positioned in said extended position;
   a control unit being in communication with said fluidic piston-cylinder actuator for controlling positioning of said piston portion is said retracted and extended positions;
   said tractor having a compressor in fluid communication with said cylinder portion of said fluidic piston-cylinder actuator for moving said piston portion between said retracted and extended positions;
   said control unit being electrically connected to said compressor to control actuation of said compressor;
   said control unit having an actuator for selectively controlling actuation of said compressor to position said piston in said retracted and extended positions; and
   said control unit having a pair of visual indicators, one of said visual indicators being illuminated when said piston portion is in said retracted position, the other of said visual indicators being illuminated when said piston is in said extended position.

* * * * *